United States Patent [19]

Henning

[11] Patent Number: 5,127,678
[45] Date of Patent: Jul. 7, 1992

[54] AIRHOSE DAMAGE PROTECTION

[76] Inventor: Steven A. Henning, 21505 48th Ave. W. H-103, Mountlake Terrace, Wash. 98043

[21] Appl. No.: 662,304

[22] Filed: Feb. 28, 1991

[51] Int. Cl.⁵ .............................. F16L 55/00
[52] U.S. Cl. ..................... 285/45; 285/38; 285/315; 285/381; 156/86
[58] Field of Search .......... 285/45, 38, 316, 381, 285/252, 253; 156/85, 86; 264/230, 342 R

[56] References Cited

U.S. PATENT DOCUMENTS

| | | | |
|---|---|---|---|
| 3,052,488 | 9/1962 | Bruning | 285/45 X |
| 4,007,909 | 2/1977 | Buseth et al. | 285/316 X |
| 4,732,412 | 3/1988 | Van de Linden et al. | 285/381 X |
| 4,792,162 | 12/1988 | Medvick | 285/316 X |
| 4,896,904 | 1/1990 | Gadsdem et al. | 156/86 X |
| 5,058,928 | 10/1991 | Watson | 285/315 X |

Primary Examiner—Dave W. Arola
Attorney, Agent, or Firm—Conrad O. Gardner; B. A. Donahue

[57] ABSTRACT

Airhose coupling device including end fittings and quick disconnect release switches having protection for preventing damage to surfaces coming in contact therewith.

2 Claims, 2 Drawing Sheets

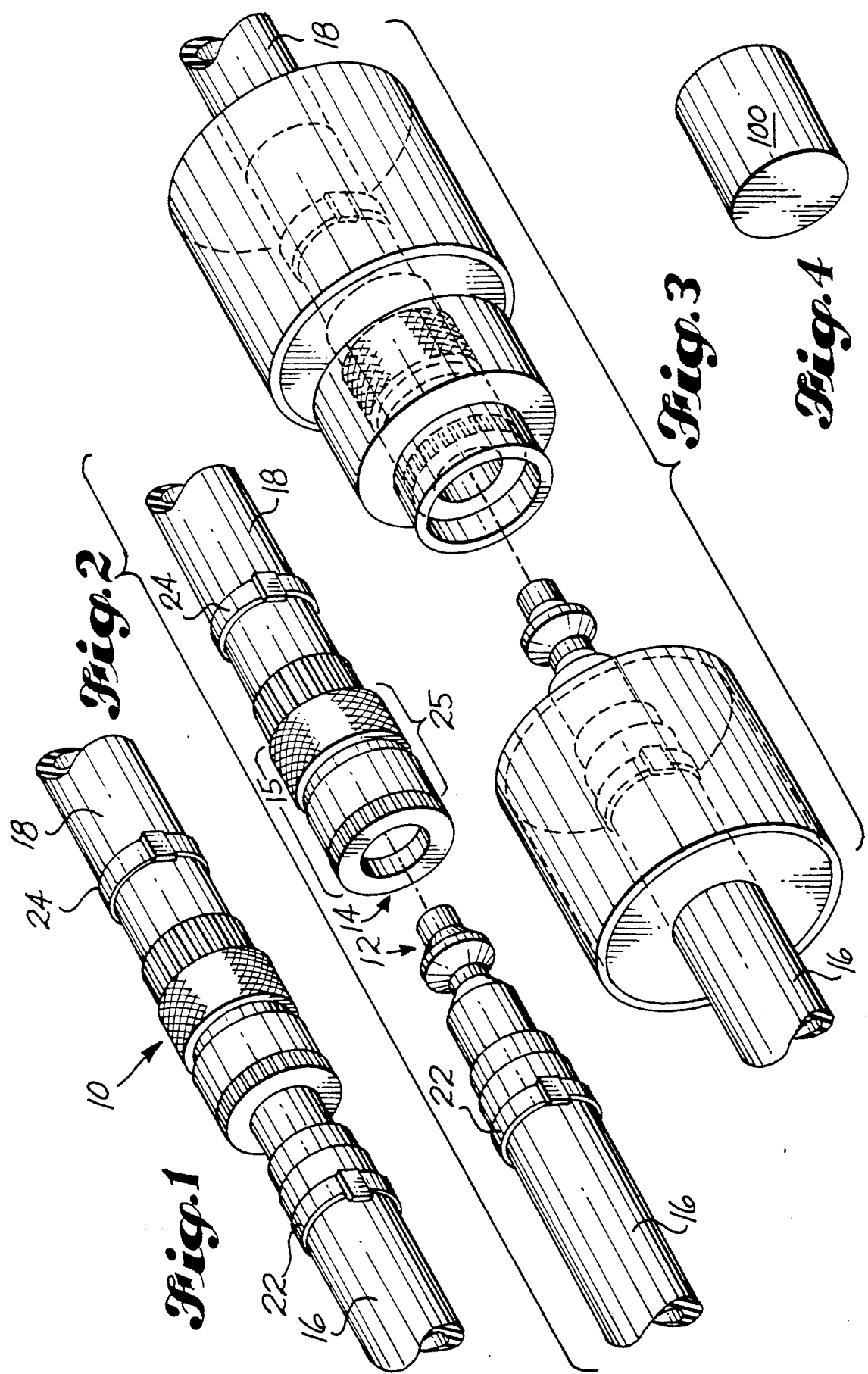

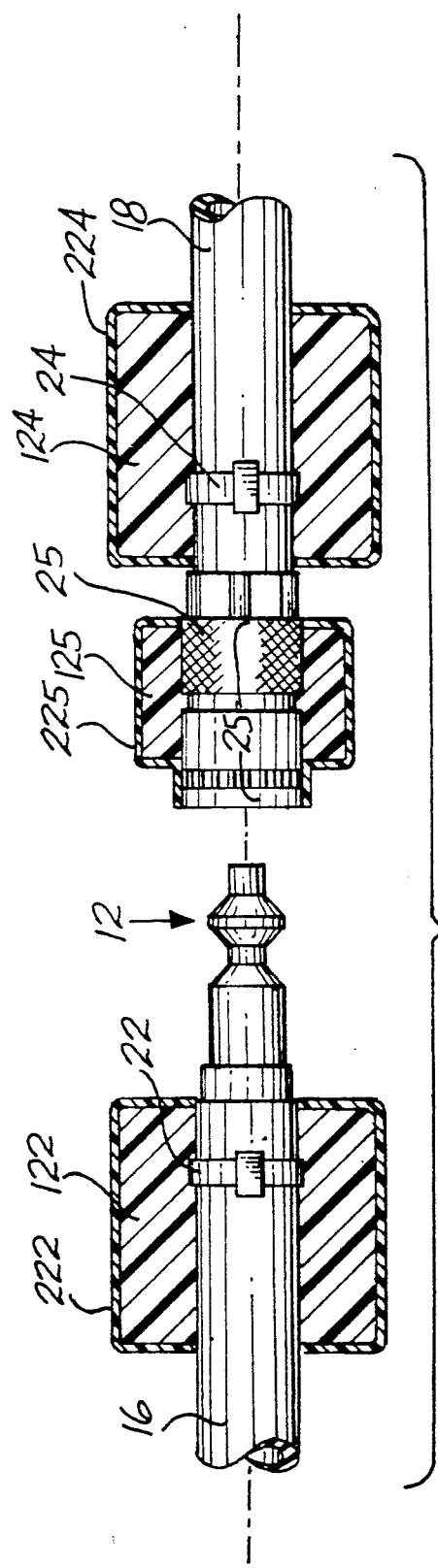
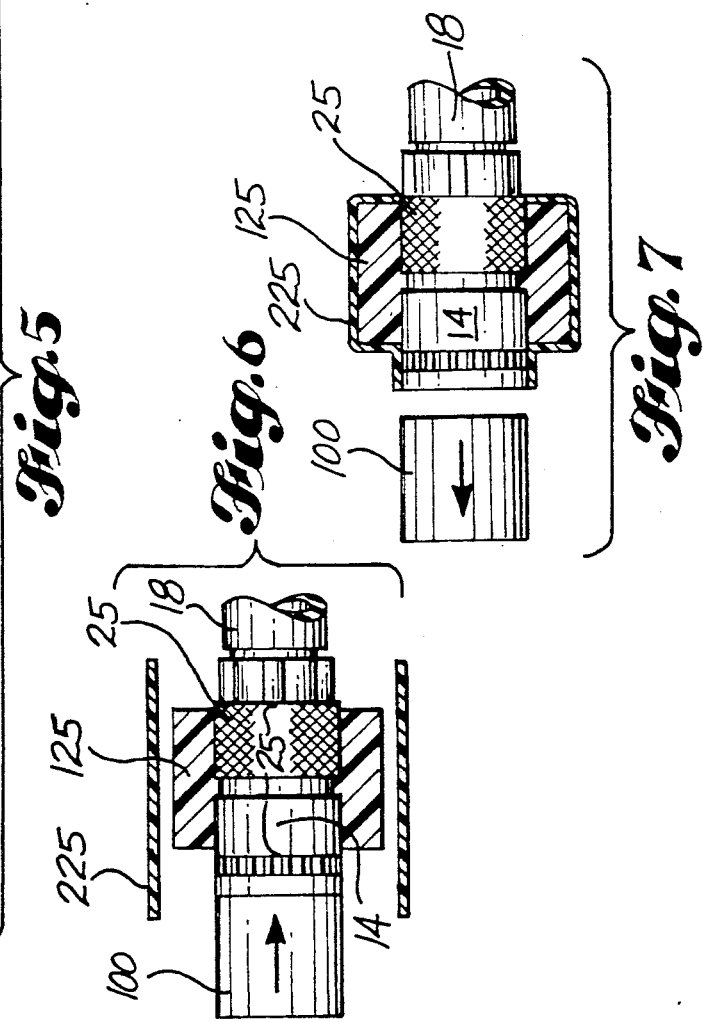

AIRHOSE DAMAGE PROTECTION

FIELD OF THE INVENTION

This invention relates generally to air hose assemblies and more particularly to damage protection means for protecting surfaces or objects coming in contact with metallic surface portions of hose coupling end fittings including quick disconnect fittings such as release switches.

BACKGROUND OF THE INVENTION

Heretofore foam plastic has been utilized to protect electrical connectors or tubing and boxes as exemplified in U.S. Pat. No. 3,332,051 to R. F. Pippin, Jr. et al and U.S. Pat. No. 3,734,273 to Watanabe however such prior art literature does not appear to utilize foam to protect the structures with which they can make physical contact and further, does not protect the foam by heat shrinkable plastic. Further illustrative of the prior art patent literature is U.S. Pat. No. 3,565,116 to Gabin which utilizes heat shrinkable plastic to strengthen hose, but not in conjunction with foam to protect the hose connectors or adjacent structure.

Accordingly, the present invention provides airhose damage protection for any objects coming in contact with end fittings and quick disconnect release switches whether they are connected or not.

SUMMARY OF THE INVENTION

According to the invention, cylindrical shaped foam pads are located on each end of an airhose and placed over the metal bands that hold the rubber airhose to the airhose end fittings. Also a cylindrical shaped foam pad is located over the release switch. Heat shrinkable plastic covers each of the cylindrically shaped foam pads.

Advantages and benefits of the present airhose damage protection provided by the aforementioned heat shrinkable plastic covered cylindrically shaped foam pads coaxially disposed about the metal bands and release switch include:
1) Protects workers from being injured when airhose couplings are disconnected and dropped.
2) Easier to disconnect airhoses. The padded release switch is easier to grab.
3) Protects objects from being damaged when airhoses are disconnected and dropped.
4) Prevents damage when airhoses are dragged across airplane skins and interiors.
5) Prevents damage to underlying surfaces (e.g. floor panels) when airhose connections are stepped on.
6) Protectors are easy to replace.
7) Protectors do not have to be moved aside or completely removed from over the fittings when disconnecting the airhose. They always stay with the airhose.
8) There is still protection on the airhoses when they are disconnected to keep the fittings from damaging anything.

Accordingly, an object of the invention was to provide airhose damage protection wherein the fittings themselves must not be covered so connecting and disconnecting was not hampered in any manner while still providing adequate protection on the airhose whether connected or disconnected.

BRIEF DESCRIPTION OF THE DRAWINGS

FIG. 1 is an isometric view of an airhose assembly prior to utilization of the present airhose damage protection, shown in a connected condition;

FIG. 2 is an isometric view of the airhose assembly of FIG. 1 disconnected;

FIG. 3 is an isometric view of the airhose assembly of FIG. 2 showing internal parts in more detail and including the present airhose damage protection;

FIG. 4 is an isometric view of a cylindrically shaped aluminum rod section utilized in the method of providing damage protection for the release switch portion of the hose coupling end fitting;

FIG. 5 is a cross section of the airhose assembly of FIG. 3 showing in more detail the heat shrinkable plastic covered cylindrical shaped foam pad protection utilized in the present airhose coupling devices;

FIG. 6 is a cross sectional view of the release switch portion of the hose coupling end fitting of FIG. 5 showing positioning of the cylindrically shaped aluminum rod section prior to application of heat shrinkable plastic tubing to the cylindrically shaped foam pad protection coaxially disposed about the quick disconnect release switch; and, FIG. 7 is illustrative of withdrawl of cylindrically shaped aluminum rod section subsequent to application of heat shrinkable plastic tubing to the cylindrically shaped foam pad protection coaxially disposed about the quick disconnect release switch.

DESCRIPTION OF THE PREFERRED EMBODIMENT

Turning now to FIGS. 1 and 2 of the drawings it will be seen that airhose coupling 10 includes end fittings 12 and 14 (FIG. 2) located at the respective ends of hoses 16 and 18. From FIG. 2, it can be seen how conventional metal bands 22 and 24 hold rubber air hoses 16 and 18 respectively to end fittings 12 and 14. End fitting 14 is a quick disconnect fitting having an outer circumferential metallic surface portion 15 also requiring damage protection.

Airhose damage protection is provided through utilization as seen in FIG. 5 of cylindrically shaped foam pads 122, 125 and 124 coaxially disposed respectively around metal band 22, quick release switch 25, and metal band 24. Cylindrically shaped foam pads 122 and 124 indisposed about metal bands 22 and 24 comprised a 2 inch wide foam strip having pressure sensitive adhesive backing wrapped around each of metal bands 22 and 24 until enough layers provided the desired thickness. The outer surfaces of cylindrically shaped foam pads 122 and 124 were provided with a 3 inch outer cover of 2 inch diameter heat shrinkable tubing 222 and 224 respectively, e.g. Polyolefin made by The 3M Company.

Airhose damage protection for end fitting 14 which is a quick disconnect fitting having a quick release switch 25 provided as seen in FIG. 5 with cylindrically shaped foam pad 125 which was built up by a 1 inch wide winding of foam with pressure sensitive adhesive backing covered with a one and one half inch diameter by one and three quarter inch plastic heat shrink tubing 225 e.g. Polyolefin made by The 3M Company thereby giving damage protection even when airhose 18 is in a disconnected condition as seen in FIG. 5.

In the method of assembly of airhose damage protection for end fitting 14, a fifteen sixteenths inch diameter one inch long portion of rod 100 (seen in FIG. 4) was temporarily positioned abutting the end of end fitting 14 (as seen in FIG. 6) prior to application of heat shrink tubing 225 around the outer surface of cylindrically shaped foam pad 125 to prevent the head of shrink tubing 225 from shrinking over the front end of end fitting 14, which would make the release switch 25 inoperable. Rod 100 was removed (as seen in FIG. 7) after heat shrink tubing 225 was allowed to cool.

Correct thickness of the padding in the aforementioned airhose damage protection was verified by testing with 180 pounds placed on top of the airhose and positioned on top of a honeycomb composite panel. No damage occurred to the underlying panel.

The present airhose damage protection remains with the airhose at all times as a permanent part thereof, thereby preventing damage to e.g. floors, airplane skins, airplane interiors etc. that may come into contact with the protected air hose end fittings whether by dropping, stepping on, or dragging of these end fittings. Airhose damage protection provided for the quick disconnect air hose release also enables easier connection and disconnection of the airhoses.

What is claimed is:

1. In combination:
   a metal band;
   an airhose coupled to an airhose end fitting;
   said metal band circumferentially disposed about said airhose and securing said airhose to said airhose fitting wherein the improvement comprises:
   airhose damage protection consisting of a cylindrically shaped foam pad coaxially disposed about and engaging said metal band, and a plastic sleeve comprising heat shrink tubing disposed around and shrunk onto the outer surface of said cylindrically shaped foam pad.

2. A method for providing airhose damage protection for a quick release end fitting having an end portion and an outer circumferential metallic surface portion comprising:
   winding a plurality of turns of an adhesive backed foam tape about said outer circumferential metallic surface portion to provide a foam pad of predetermined thickness;
   abutting a cylindrically shaped rod against said end portion of the quick release end fitting;
   disposing heat shrinkable plastic tubing about the outer surface of said foam pad of predetermined thickness; and
   heating said heat shrinkable plastic tubing to effect shrinkage thereof whereby said heat shrinkable plastic tubing engages said foam pad and cylindrically shaped rod;
   allowing said heat shrinkable plastic tubing to cool and,
   then removing said cylindrically shaped rod from said end portion of said quick release end fitting.

* * * * *